US010803177B2

(12) United States Patent
Adam et al.

(10) Patent No.: US 10,803,177 B2
(45) Date of Patent: *Oct. 13, 2020

(54) COMPLIANCE-AWARE RUNTIME GENERATION BASED ON APPLICATION PATTERNS AND RISK ASSESSMENT

(71) Applicant: International Business Machines Corporation, Armonk, NY (US)

(72) Inventors: Constantin Mircea Adam, Norwalk, CT (US); Nikolaos Anerousis, Chappaqua, NY (US); Jinho Hwang, Ossining, NY (US); Shripad Nadgowda, Pratap Nagar (IN); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/653,676

(22) Filed: Jul. 19, 2017

(65) Prior Publication Data

US 2019/0026472 A1    Jan. 24, 2019

(51) Int. Cl.
*G06F 21/53*   (2013.01)
*G06F 21/57*   (2013.01)
(Continued)

(52) U.S. Cl.
CPC .......... *G06F 21/577* (2013.01); *G06F 21/563* (2013.01); *G06F 21/564* (2013.01); *G06F 21/54* (2013.01); *G06F 21/566* (2013.01)

(58) Field of Classification Search
None
See application file for complete search history.

(56) References Cited

U.S. PATENT DOCUMENTS 8,005,950 B1 *   8/2011   Ashcraft ............... G06F 9/5016
                                                           709/224
8,984,327 B1 *   3/2015   Jain ..................... H04L 41/5025
                                                             714/3
(Continued)

FOREIGN PATENT DOCUMENTS

CN         105637833 A    6/2016
EP           1619572 A1    1/2006

OTHER PUBLICATIONS

An Online Monitoring Approach for Web Services. Wang et al. IEEE. (Year: 2007).*

(Continued)

*Primary Examiner* — Venkat Perungavoor
(74) *Attorney, Agent, or Firm* — Amin, Turocy & Watson, LLP

(57) ABSTRACT

Systems, computer-implemented methods and/or computer program products that facilitate compliance-aware runtime generation of containers are provided. In one embodiment, a computer-implemented method comprises: identifying, by a system operatively coupled to a processor, information used by a target application to containerize; determining whether one or more risk violations exist for the information within one or more defined thresholds; determining whether a compliance or a security violation exists in the information, wherein the determining whether the compliance or security violation exists is performed based on a determination by the risk assessment component that one or more risk violations do not exist; and generating a new container of components corresponding to defined components of the target application that allow the target application to execute without an underlying operating system, wherein the generating is based on a determination that no compliance or security violation exists in the information.

20 Claims, 13 Drawing Sheets

(51) Int. Cl.
    *G06F 21/56*     (2013.01)
    *G06F 21/71*     (2013.01)
    *G06F 21/54*     (2013.01)

(56) References Cited

U.S. PATENT DOCUMENTS

| | | | |
|---|---|---|---|
| 9,069,967 B2* | 6/2015 | Wysopal | G06F 11/3612 |
| 9,116,768 B1 | 8/2015 | Sawhney et al. | |
| 9,166,966 B2 | 10/2015 | Radhakrishnan | |
| 2007/0101432 A1 | 5/2007 | Carpenter | |
| 2007/0220137 A1 | 9/2007 | Chess et al. | |
| 2008/0016339 A1* | 1/2008 | Shukla | G06F 21/566 |
| | | | 713/164 |
| 2008/0235756 A1* | 9/2008 | Cohen | G06F 9/45533 |
| | | | 726/1 |
| 2013/0219156 A1 | 8/2013 | Sears | |
| 2015/0089300 A1 | 3/2015 | Tejerina et al. | |
| 2016/0043892 A1 | 2/2016 | Hason et al. | |
| 2016/0292419 A1 | 10/2016 | Langton et al. | |
| 2016/0314298 A1 | 10/2016 | Martini et al. | |
| 2018/0218149 A1* | 8/2018 | Jacobs | G06F 21/54 |
| 2018/0336351 A1* | 11/2018 | Jeffries | G06F 21/566 |

OTHER PUBLICATIONS

Retaining Sandbox Containment Despite Bugs in Privileged Memory-Safe Code. Cappos et al. ACM. (Year: 2010).*
GenProg: A Generic Method for Automatic Software Repair. Goues et al. IEEE. (Year: 2012).*
A Secure architecture design based on application isolation, code minimization and randomization. Gupta et al. IEEE. (Year: 2013).*
U.S. Appl. No. 15/653,676, filed Jul. 19, 2017.
U.S. Appl. No. 15/842,534, filed Dec. 14, 2017.
List of IBM Patents and Applications Treated as Related.
Hwang, et al., "Generating Containers for Applications Utilizing Reduced Sets of Libraries Based on Risk Analysis," U.S. Appl. No. 15/216,190, filed Jul. 21, 2016, 48 pages.
International Search Report and Written Opinion for International Application Serial No. PCT/IB2018/054458 dated Oct. 25, 2018, 9 pages.
Final Office Action received for U.S. Appl. No. 15/842,534 dated Jul. 15, 2019, 48 pages.
Jai, Benchiao, "Automatic Deployment of Object-Oriented Component Software", 2015, pp. 1-30.
Non-Final Office Action received for U.S. Appl. No. 15/842,534 dated Mar. 25, 2019, 35 pages.

\* cited by examiner

Inputs: Labeled set $D_l$, unlabeled set $D_u$, number of steps $T$, number of examples per iteration $S$
$t = 1$;
*while* $t <= T$ *do*
    Train a multi-label SVM classifier $f$ based on training data $D_l$
    for each instance $x$ in $D_u$ do
        Predict its label vector $\underline{y}$ using the LR(loss reduction)-based prediction method
        $D^*_s = \text{argmax}_{D_s} (\sum_{x \in D_s} \sum_{i=1}^k ((1 - \underline{y}^i f_i(x)) / 2))$
        constrained to $\underline{y}^i \in \{-1, 1\}$
        (equation for Maximum loss reduction with the most confident label vector $\underline{y}$,
        Calculate the expected loss reduction with maximal confidence)
        $\text{score}(x) = \sum_{i=1}^k ((1 - \underline{y}^i f_i(x))/2)$
    Sort score(x) in decreasing order for all $x$ in $D_u$
    Select a set of $S$ examples $D^*_s$ with the largest scores (or experienced SME input),
    and update the training set $D_l <- D_l + D^*_s$
    end for
    Train the multi-label learner $l$ with $D_l$
    $t = t + 1$;
*end while*

FIG. 6

COMPLIANCE-AWARE RUNTIME GENERATION BASED ON APPLICATION PATTERNS AND RISK ASSESSMENT

BACKGROUND

The subject disclosure relates to facilitating compliance-aware runtime generation of containers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments herein, devices, systems, computer-implemented methods, apparatus and/or computer program products that facilitate compliance-aware runtime generation of containers are described.

According to one embodiment, a system is provided. The system can comprise a memory that stores computer executable components. The system can also comprise a processor, operably coupled to the memory, and that can execute computer executable components stored in the memory. The computer executable components can comprise a collection component that can identify information used by a target application to containerize. The computer executable components can further comprise a risk assessment component that can determine whether one or more risk violations exist for the information within one or more defined thresholds. The computer executable components can further comprise a compliance component that can determine whether a compliance or a security violation exists in the information, wherein the determination by the compliance component is performed based on a determination by the risk assessment component that one or more risk violations do not exist. The computer executable components can further comprise a construction component that, based on a determination that no compliance or security violation exists in the information, can generate a new container corresponding to defined components of the target application that allow the target application to execute without an underlying operating system.

According to another embodiment, a computer-implemented method is provided. The computer-implemented method can comprise identifying, by a system operatively coupled to a processor, information used by a target application to containerize. The computer-implemented method can further comprise determining, by the system, whether one or more risk violations exist for the information within one or more defined thresholds. The computer-implemented method can further comprise determining, by the system, whether a compliance or a security violation exists in the information, wherein the determining whether the compliance or security violation exists is performed based on a determination by the risk assessment component that one or more risk violations do not exist. The computer-implemented method can further comprise generating, by the system, a new container of components corresponding to defined components of the target application that allow the target application to execute without an underlying operating system, wherein the generating is based on a determination that no compliance or security violation exists in the information.

According to another embodiment, a computer program product for facilitating compliance-aware runtime generation of containers is provided. The computer program product can comprise a computer readable storage medium having program instructions embodied therewith. The program instructions can be executable by a processor to cause the processor to identify information used by a target application to containerize. The program instructions can further be executable by a processor to cause the processor to determine whether one or more risk violations exist for the information within one or more defined thresholds. The program instructions can further be executable by a processor to cause the processor to determine whether a compliance or a security violation exists in the information, wherein the determination regarding the compliance or security violation is based on a determination by the risk assessment component that one or more risk violations do not exist. The program instructions can further be executable by a processor to cause the processor to generate a new container of components corresponding to defined components of the target application that allow the target application to execute without an underlying operating system.

DESCRIPTION OF THE DRAWINGS

FIG. 6 illustrates an example, non-limiting computer-implemented method facilitating compliance and security classification in accordance with one more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments described herein can automatically generate a compliance-aware runtime container that can allow an application (e.g., executable, service, service instance, application instance, etc.) to run without an underlying operating system. As used herein, the terms "application," "executable," "service," "service instance," "process" and/or "application instance" can be used interchangeably herein.

Figure 1:
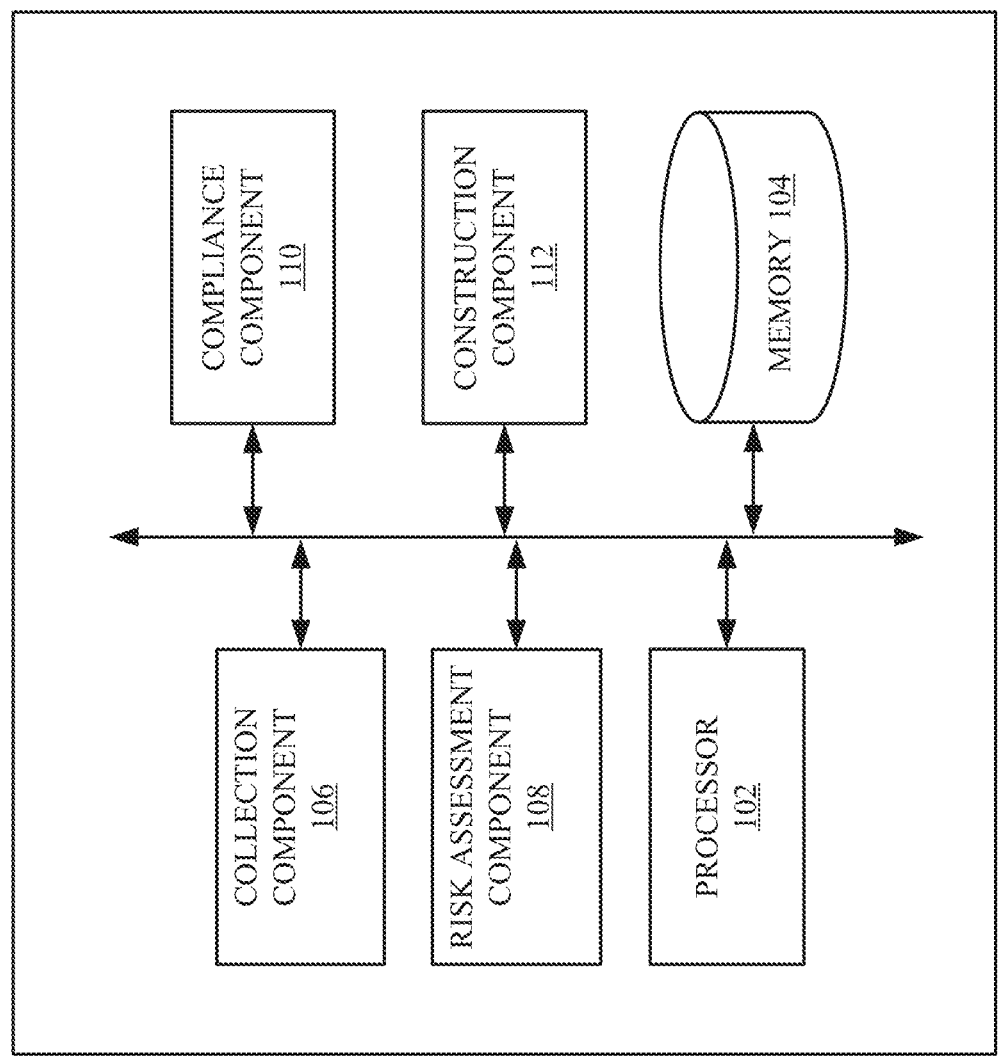
FIG. 1 illustrates a block diagram of an example, non-limiting system facilitating compliance-aware runtime generation of containers in accordance with one or more embodiments described herein.

FIG. 1 illustrates a block diagram of an example, non-limiting system 100 that can facilitate compliance-aware runtime generation of containers in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise processor 102, memory 104, collection component 106, risk assessment component 108, compliance component 110 and/or construction component 112. In some embodiments, one or more of processor 102, memory 104, collection component 106, risk assessment component 108, compliance component 110 and/or construction component 112 can be communicatively and/or operatively coupled to one another to perform one or more functions of the system 100.

In one or more embodiments described herein of system 100, predictive analytics can be used to automatically generate one or more compliance-aware runtime containers. For example, the automatic generation can be based on information retained in a patterns knowledgebase. As used herein, the term "knowledgebase" can be a database or other storage location or repository that can store one or more types of information. All such embodiments are envisaged.

The patterns knowledgebase can comprise information related to one or more applications. In some embodiments, the information related to the one or more applications can be gathered over time and retained in the patterns knowledgebase. In some embodiments, the information gathered can include risk, compliance and/or security violations used for the target application. Based on the obtained information, when or after an application is launched, the system 100 can evaluate the patterns knowledgebase (or multiple patterns knowledgebases) and generate one or more patterns and/or can map information known about the target application to the information known about other applications. The predictive analytics of system 100 can determine that, if information of the target application is similar to one or more other applications, the compliance-aware runtime containers of the similar applications can be utilized to automatically execute the target application.

The computer processing systems, computer-implemented methods, apparatus and/or computer program products described herein can employ hardware and/or software to generate compliance-aware runtime containers that are highly technical in nature, that are not abstract and that cannot be performed as a set of mental acts by a human. For example, the one or more embodiments can perform the lengthy interpretation and analysis on the available information to determine which runtime containers from the one or more runtime containers should be utilized for a target application. In another example, the one or more embodiments can perform predictive analytics on a large amount of data to automatically facilitate compliance-aware runtime generation of containers with a high level of accuracy, even in the absence of detailed knowledge about the target application. Accuracy can be evaluated by comparing a training set with a test set. After training a model employing a training set, accuracy can be calculated using a test set by computing percentage of output generated by the model running on the training set elements that matches a predicted target.

In various embodiments, the collection component 106 can identify system information such as, but not limited to, dynamic libraries (e.g., dependent files and libraries) and system calls (e.g., requests by a process for a service performed) employed by a target application to deploy. For example, in modern Unix-based operating systems, the collection component 106 can perform the list dynamic dependencies (ldd) and strace commands to track dependencies (e.g., files that are open and system calls that are made when or after a new application is launched) and find errors (e.g., version mismatch, missing files or libraries, etc.). More specifically, the collection component 106 can retain from a docker container with a service that has been deployed inside it codes that allow an application to deploy. For example, the collection component 106 can download a docker image for a target application from a docker hub.

Also, in modern Unix-based operating systems, the collection component 106 can also run the target application in a separate partition environment or separate partition folder using the chroot and strace commands to capture all (or, in some embodiments, one or more of) the codes that are running to find errors. The collection component 106 can run an application in a separate partition environment by depositing the files employed to run the application in a folder and executing the chroot command. The chroot command can switch a root file system to a separate partition directory. If an action is risky after performing the chroot and strace commands because an error indicates a file or library is missing then the collection component 106 can copy the missing file or library from the docker image if the missing file can be located. The system 100 can go through this process iteratively until the target application runs in the separate partition folder by copying and/or depositing to the separate partition folder the files and libraries employed to run an application instance that is already installed on an operating system.

One or more of the embodiments described herein can drastically reduce the number of files that are running that are typically employed in order to conform with compliance guidelines and/or policies. With a reduced number of files, vulnerability issues can also decrease. Due to the reduced image size, in one or more embodiments, there can be a reduction in network traffic. Additionally, due to the reduced image footprint, application deployment and/or boot up can also be faster.

Applications are typically classified into two categories: executables that can directly load a set of system libraries and applications that employ a language runtime. For applications with executables that can directly load a set of system libraries, the computer-implemented methods described above can generate a compliance-aware runtime container. Examples of these applications that can run directly without a runtime include, but are not limited to, nginx, MySQL, Redis, etc. For applications that employ a language runtime (e.g., Ruby, Python, Java, Erlang, etc.), the computer-implemented methods above can also build a runtime image and additional logic can determine language-specific packages (e.g., Ruby Gems, Python Wheels, Java JARs, etc.) that can be installed on the runtime image.

In some embodiments, system 100 can generate a compliance-aware runtime container by taking as input an application that is already installed on an operating system. The resulting runtime environment for the service can contain the codes employed by the service to deploy and nothing else. Every file and library (and/or in some embodiments, at least one or more file and/or library) that are included in the compliance-aware runtime container can be evaluated for vulnerability and/or compliance. Risk can be properly assessed when or after creating container images so that containers do not incorporate potentially vulnerable libraries. For example, the risk assessment component 108 can capture the files and/or libraries that are opened and/or accessed when an application is running in its native environment and analyze the files and/or libraries for vulnerabilities, as well as analyzing the configuration files for compliance. In some embodiments, the risk assessment component 108 can perform dynamic and/or static analysis of application properties to determine whether additional information (e.g., files, libraries, codes, etc.) are to be employed for a container to deploy a target application. The risk assessment component 108 can analyze and determine the feasibility of adjustments. For example, the risk assessment component 108 can determine one or more issues associated with running an application in a generated container with reduced set of files and libraries.

The risk assessment component 108 can determine whether one or more risk violations exist for the information within one or more defined thresholds. For example, a risk or impact function can be employed to measure an amount of risk to perform an action or deploy a service. If the risk value is equal to or greater than a particular defined threshold, such can indicate the system 100 may fail to run the target application. Information captured by the risk assessment component 108 can be evaluated to provide risk analytics and/or pattern formation that can be utilized when generating containers. If the risk assessment component 108 indicates an action has an accompanying risk that is greater than or equal to the defined threshold, the application can be replicated and/or one or more actions can be simulated before constructing a new container. For example, if an action has an accompanying risk that is greater than or equal to a defined threshold, after performing the chroot and strace commands (e.g., via the collection component 106) because an error indicates a file or library is missing, then the system 100 can copy the missing file or library from the docker image if the missing file or library is in the docker image. This can be an iterative process until the target application can run in the separate partition folder.

In some embodiments, the compliance component 110 can determine whether compliance or security violation exists in the information. The determination by the compliance component 110 can be based on a determination by the risk assessment component 108 that one or more defined risk violations do not exist. For example, when the risk assessment component 108 can determine that an action has an accompanying risk that is not greater than and not equal to a defined threshold (so the action is considered to be not risky), the compliance component 110 can determine whether compliance or security violation exists by employing an active learning algorithm. If a compliance or security violation is found, that information can be stored in a pattern knowledgebase. The learning can be performed as a result of analyzing two patterns for one or more applications and the uncovered security issues. More than two different containers can be created for a given application as needed. By using current activities to train data in a learning algorithm (e.g., support vector machine (SVM)), patterns can be learned and/or can be employed to expedite compliance and/or security evaluations by analyzing the differences. Additionally, a machine learning process of system 100 can be used to analyze the steps in generating a compliance-aware runtime container and expedite the process. For example, a machine learning process can recognize patterns and/or can evaluate whether a piece of code is redundant, unnecessary or irrelevant. Patterns and/or pattern recognition can be employed to make the process of collecting system information by the collection component 106 more efficient thereby saving resources and time. If no compliance or security violation exists, a compliance-aware runtime container can be generated.

The construction component 112 can generate a new container that allows the target application to execute without an underlying operating system in some embodiments. The generation of a compliance-aware runtime container can be based on a determination that no compliance or security violation exists in the information (e.g., files, libraries, codes, etc., employed to run a target application). The lack of an operating system in a container can removes the need to perform compliance evaluations such as password management and operating system resources. This can also automatically prevent users from installing additional services such as secure socket shell (SSH) on a container, which can expose a container to other potential security vulnerabilities.

More specifically, the construction component 112 can generate containers and, in some embodiments, can include only the files and libraries that are employed by a container to run a specific service or application. After a determination is made that no compliance or security violation exists (e.g., via the risk assessment component 108 and compliance component 110) and the target application is running inside a separate partition folder (e.g., via collection component 106) the construction component 112 can copy the files and libraries employed to run the application into a dockerfile. Accordingly, in some embodiments, the construction component 112 can utilize the dockerfile to generate container images with compliance guaranteed and minimal security risk. The same components and/or processes that is used to generate these compliance guaranteed container images can be used for all running containers to assess risk, compliance and/or security violations.

In some embodiments, these compliance-aware runtime generated containers are also immutable. In some embodiments, immutable containers cannot be entered and/or modified because there are no shells. As such, the image that was originally deployed can be the image that is going to run, and there is no easy way to change the structure of this immutable, compliance-aware runtime container. These generated containers can allow the application to run without the need for an underlying operating system. A container without an underlying operating system can also have an accompanying reduced risk of attack surface because without an underlying operating system there are less files and libraries to modify (e.g., attack). A smaller attack surface in turn can reduce compliance costs and enhance security. The result can be a drastic reduction in cost of operating a service by shifting focus to compliance for the application itself and eliminating the cost of configuring and securing a complex underlying operating system.

Figure 2:
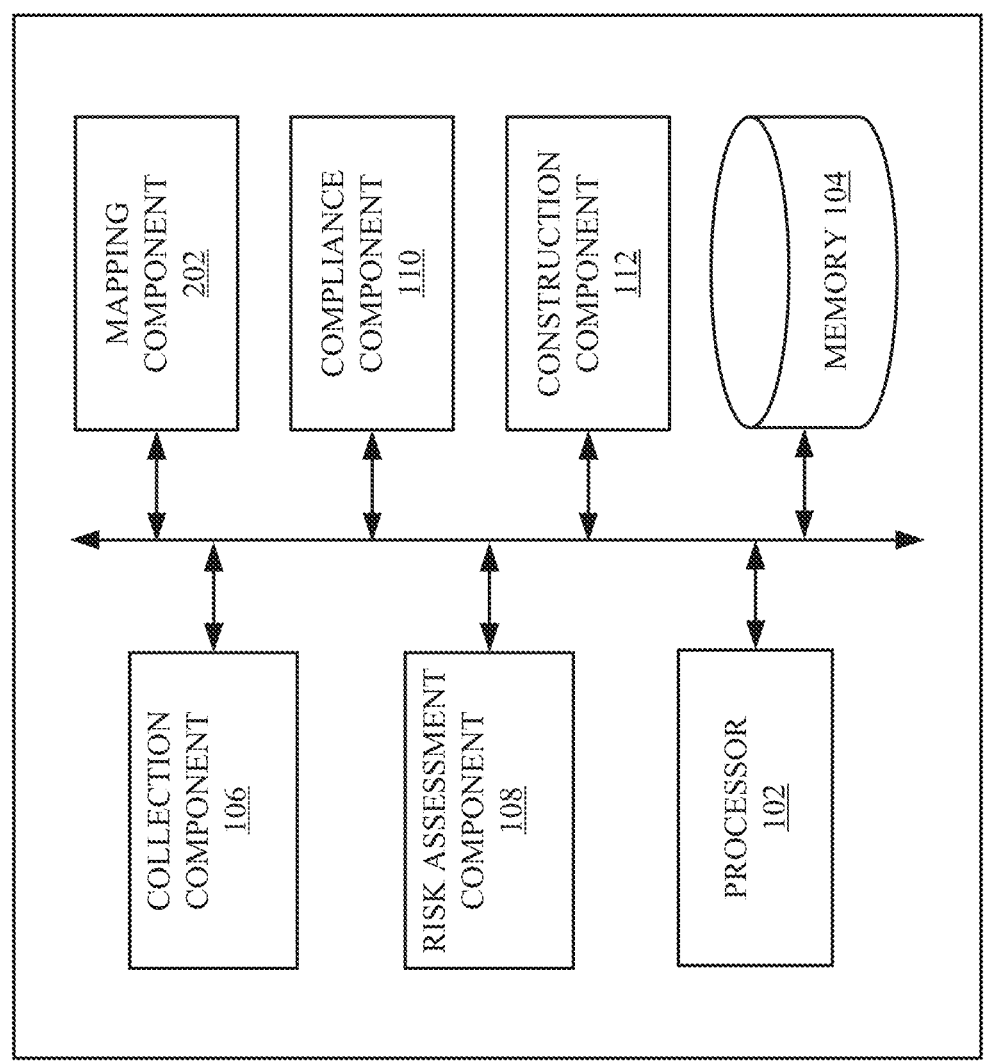
FIG. 2 illustrates a block diagram of an example, non-limiting system facilitating compliance-aware runtime generation of containers including a mapping component in accordance with one or more embodiments described herein.

FIG. 2 illustrates a block diagram of an example, non-limiting system 200 facilitating compliance-aware runtime generation of containers including a mapping component 202 in accordance with one or more embodiments described herein. Repetitive description of like elements employed in other embodiments described herein is omitted for sake of brevity. System 200 can also include the mapping component 202. The mapping component 202 can automatically map one or more features to one or more system operations or libraries. The mapping of one or more system operations or libraries can comprise a mapping of one or more compliance and security related features. For example, in an embodiment, the mapping component 202 can map system information associated with a learned compliance-aware runtime assessed by the risk assessment component 108 and compliance component 110.

Figure 3:
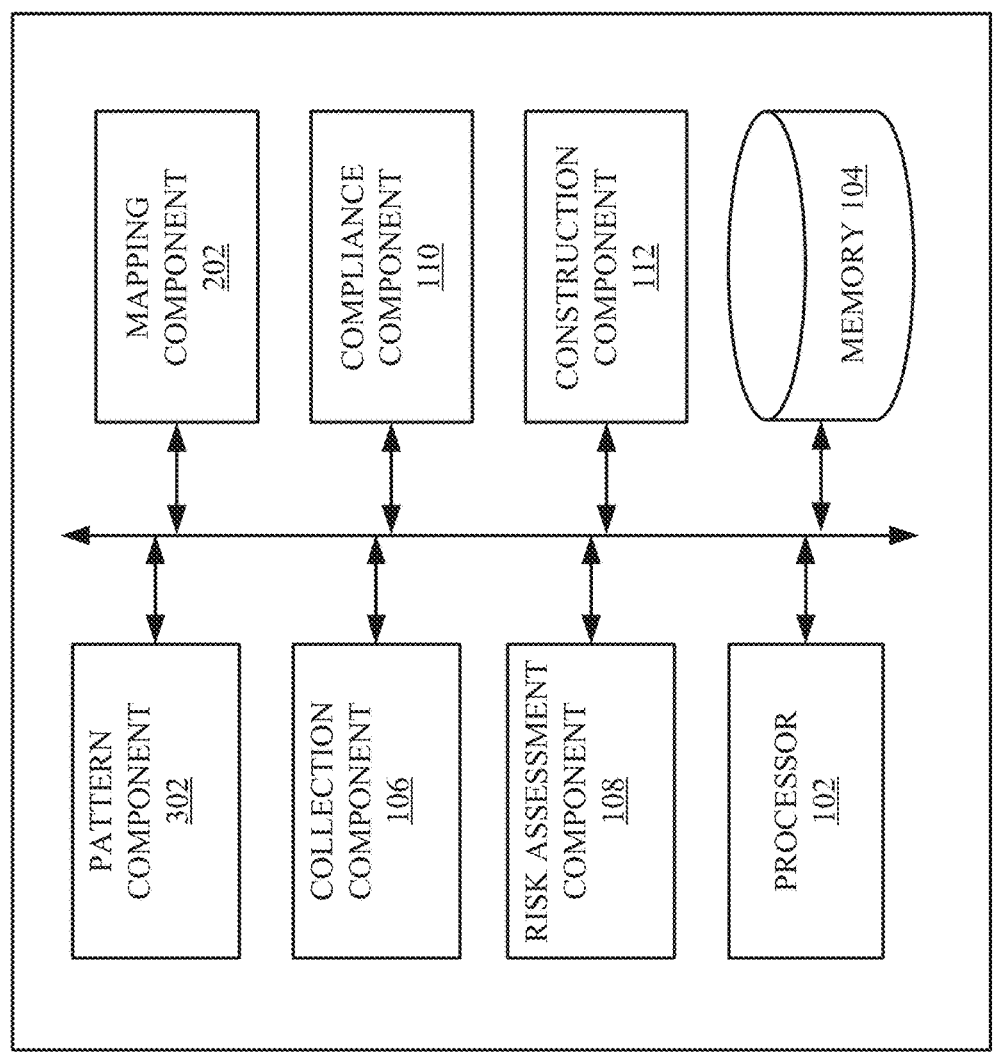
FIG. 3 illustrates a block diagram of an example, non-limiting system facilitating compliance-aware runtime generation of containers including a pattern component in accordance with one or more embodiments described herein.

Turning now to FIG. 3, which illustrate a block diagram of an example, non-limiting system 300 facilitating compliance-aware runtime generation of containers including a pattern component 302 in accordance with one or more embodiments described herein. Repetitive description of like elements employed in other embodiments described herein is omitted for sake of brevity. The pattern component 302 can generate one or more patterns employed to automatically construct one or more compliance-aware runtime container images. The generation of the one or more patterns can be performed based on a determination by the risk assessment component 108 that one or more risk violations exist for the information and/or based on a determination by the compliance component 110 that compliance or security violations exist in the information. For example, if the risk assessment component 108 determines an action has a risk value equal to or greater than a defined threshold, the pattern component 302 can generate one or more patterns that can be employed to construct one or more container images. Also, if the compliance component 110 determines that compliance or security violations exist in the information, the pattern component 302 can generate one or more patterns employed to construct one or more container images.

Figure 4:
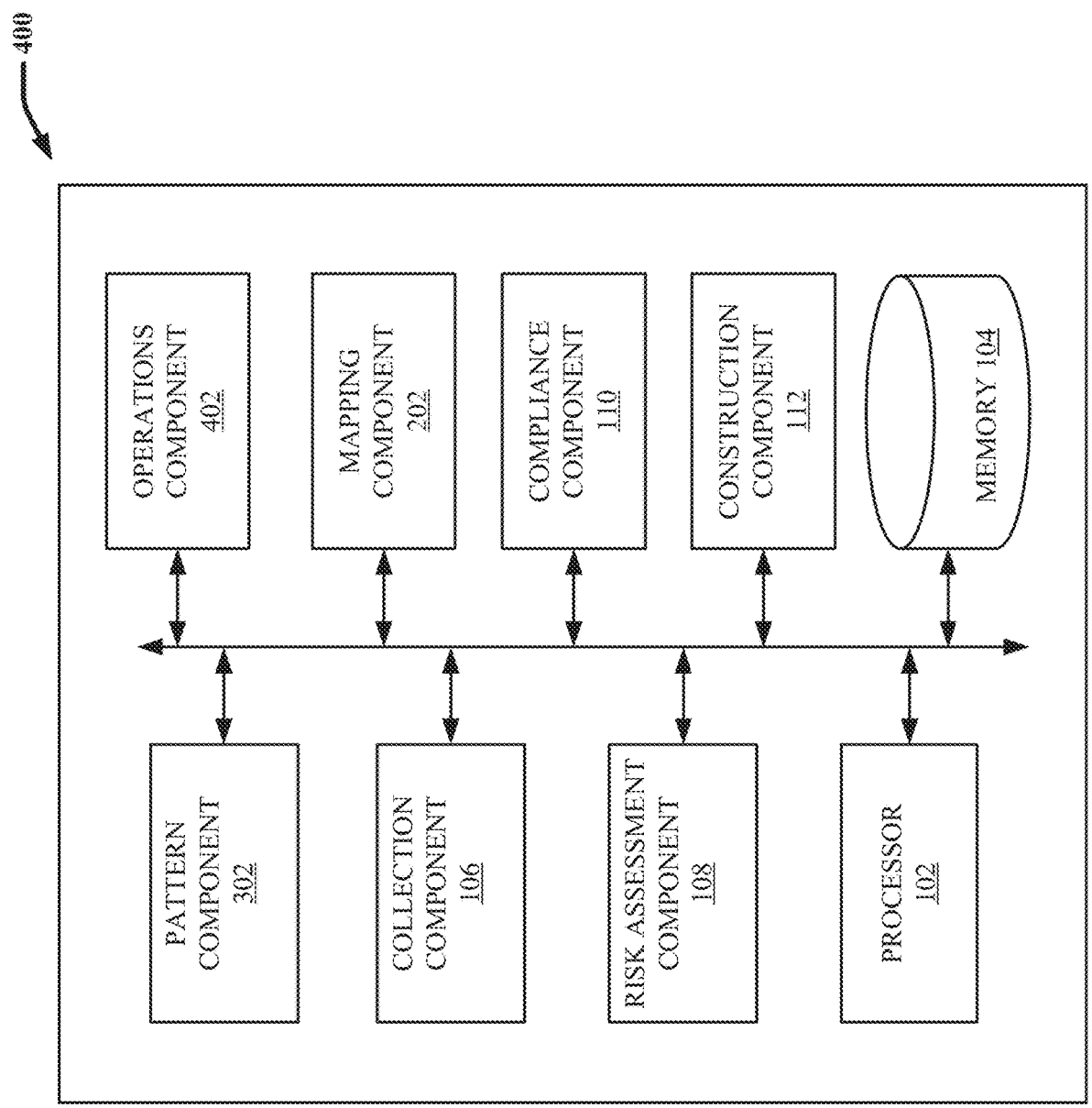
FIG. 4 illustrates a block diagram of an example, non-limiting system facilitating compliance-aware runtime generation of containers including an operations component in accordance with one or more embodiments described herein.

FIG. 4 illustrates a block diagram of an example, non-limiting system 400 facilitating compliance-aware runtime generation of containers including an operations component 402 in accordance with one or more embodiments described herein. Repetitive description of like elements employed in other embodiments described herein is omitted for sake of brevity. The operations component 402 can halt a process of the operating system. In some embodiments, the operations component 402 can determine when to halt a process of the operating system based on patterns generated by the pattern component 302. Referencing the patterns generated by the pattern component 302, which can be generated based on a determination that one or more risk violations exist (e.g., via the risk assessment component 108) or based on a determination that compliance and security violations exist in the information (e.g., via the compliance component 110), the operations component 402 can halt the operating system if risk, compliance or security violation exists. More specifically, the operations component 402 can access risk, compliance and/or security violations information analyzed by pattern component 302 to alert users that an action has an accompanying risk that is greater than or equal to a defined threshold, has compliance violations or has security violations.

Together, the components of systems 100, 200, 300 and/or 400 can communicate with each other to generate a compliance-aware container and/or collect the information learned through the process for future use. The collection component 106 can identify information used by a target application and this information can be used by the risk assessment component 108 and the compliance component 110 to assess risk, compliance and security related issues. Risk, compliance and/or security assessment can be performed continually for both dynamic and static analyses of the application properties. The information analyzed by the risk component 108 and compliance component 110 can be utilized by the mapping component 202 to generate maps and can be utilized by the pattern component 302 to generate patterns. The operations component 402 can employ the patterns generated based risk, compliance and security violations to halt processes of the operating system.

Figure 5:
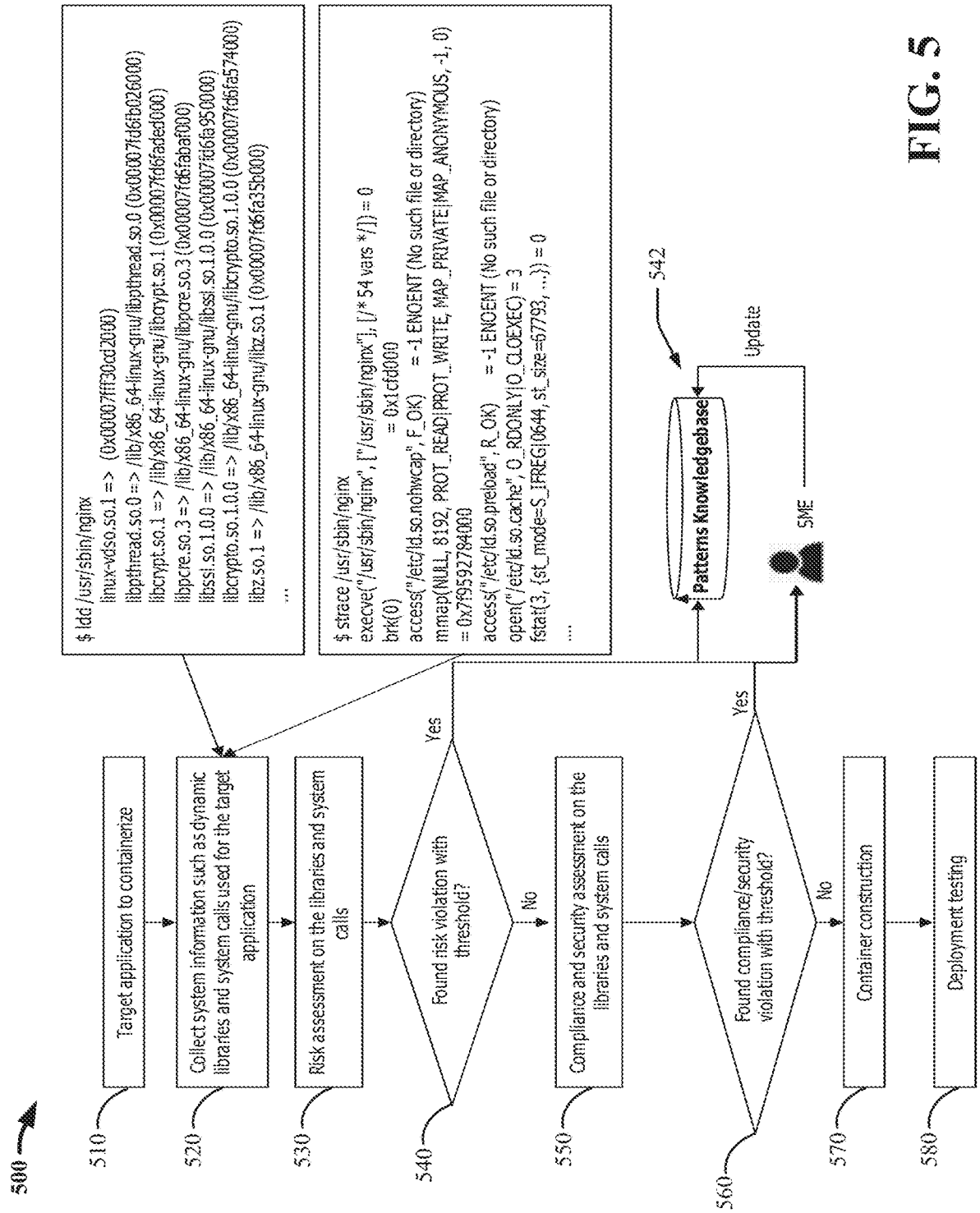
FIG. 5 illustrates an example, non-limiting computer-implemented method facilitating compliance-aware runtime generation of containers in accordance with one or more embodiments described herein.

FIG. 5 illustrates an example, non-limiting computer-implemented method 500 that facilitates compliance-aware runtime generation of containers in accordance with one or more embodiments described herein. Repetitive description of like elements employed in other embodiments described herein is omitted for sake of brevity. Computer-implemented method 500 employs nginx as an example of an executable that can directly load a set of system libraries or an executable that can run directly without a runtime. At 510, computer-implemented method 500 can comprise identifying a target application to containerize (e.g., via the collection component 106).

At 520, computer-implemented method 500 can comprise collecting system information such as dynamic libraries and system calls used for the target application (e.g., via the collection component 106). System information can be determined by performing the ldd command to identify immediate dependencies for the executable. The identification can also include downloading a docker image for the target application from the docker hub and performing the chroot and strace commands to capture all the codes that are running to find errors. This process can be completed by creating a separate partition environment or separate partition folder that can run an executable inside it by performing the chroot command. The executable that runs inside the separate partition folder will respond as if it was the root directory of the file system. If after performing the chroot and strace commands an error indicates a file or library is missing then copy the missing file or library from the docker image if the missing file or library is there. This can be an iterative process that can be performed until the executable can run inside the separate partition folder. The result is a separate partition folder with a set of files and libraries that is employed for the code to run and nothing more. At a point in which the files or libraries employed are running inside the separate partition folder, computer-implemented method 500 can comprise copying the files and libraries that are used to run the target application into a new dockerfile. The new dockerfile can be used to generate a new docker image with a compliance-aware runtime. At 530, computer-implemented method 500 can comprise performing a risk assessment on the libraries and system calls (e.g., via the risk assessment component 108). A risk or impact function can be used to assess the potential risks of running an application with a reduced set of files and libraries.

A non-limiting example of a sample risk or impact function can be $R(\theta,\delta)=E_{74},L(\theta,\delta(X))=\int_x L(\theta,\delta(X))dP_\theta(X)$, in which risk function R is a value that varies from 0 to 1. $\theta$ is a fixed value, and possibly unknown, state of nature. X is a vector of observations stochastically drawn from a population, e.g., prior application or server profiles, a list of related upgrade actions, versions, available service management function, etc. $E_\theta$ is the expectation over all population values of X. $dP_\theta$ is a probability measure over the event space of X, parameterized by $\theta$, and the integral is evaluated over the entire support of X. If the risk value exceeds a defined threshold, an application can be replicated and/or actions can be simulated for a safety check or risk analysis.

At 540, computer-implemented method 500 can comprise determining whether a risk violation is found (e.g., via the risk assessment component 108). A risk analysis can be determined by comparing the risk value with a defined threshold value. If a risk violation is found, then at 542, computer-implemented method 500 can comprise inputting risk violations information in a patterns knowledgebase (e.g., via the risk assessment component). If no risk violation is found, then at 550, computer-implemented method 500 can comprise performing a compliance and security assessment on the libraries and system calls (e.g., via the compliance component 110). A compliance and security can be determined by employing an active learning algorithm, as detailed in below in FIG. 6. Then at 560, computer-implemented method 500 can comprise determining whether compliance and security violations are found with a predetermined threshold (e.g., via the compliance component 110). If compliance and security violation is found, then at 542, computer-implemented method 500 can comprise inputting the compliance and security violation information in a patterns knowledgebase (e.g., via the compliance component 110). If no compliance and security violation is found, then at 570, computer-implemented method 500 can comprise generating compliance-aware container (e.g., via the construction component 112). Then at 580, computer-implemented method 500 can comprise performing deployment testing.

The various aspects (e.g., in connection with automatically assessing compliance and security violations) can employ various artificial intelligence-based schemes for carrying out various aspects thereof. For example, a process for evaluating one or more parameters of a target application can be utilized to predict one or more responses to the assessment, without interaction from the target application, which can be enabled through an active learning algorithm. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

FIG. 6 illustrates an example, non-limiting computer-implemented method 600 facilitating compliance and security classification in accordance with one more embodiments described herein. The computer-implemented method 600 can be a multi-label SVM-based active learning algorithm facilitating compliance and security classification. In some embodiments, computer-implemented method 600 can take as input a labeled set $D_l$, an unlabeled set $D_u$, a number of steps T, and a number of examples per iteration S. The computer-implemented method 600 can train a multi-label SVM classifier f based on training data $D_l$. For example, for each instance x in the unlabeled set $D_u$, computer-implemented method 600 can predict its label vector y using the loss reduction (LR) based prediction method with an equation for maximum loss reduction with maximal confidence. Computer-implemented method 600 can calculate the expected loss reduction with the most confident label vector y; sort score x in decreasing order for all x in $D_u$, and select a set of examples with the largest scores. The selection can be based on subject matter expert (SME) input. The function $f_i(x)$ is a SVM classifier associated with class i. Data points $x_1, \ldots x_n$ represent feature vector for each x (libraries, system calls, operating system information, configuration information, application information, etc.) and compliance and security compatibility.

Figure 7:
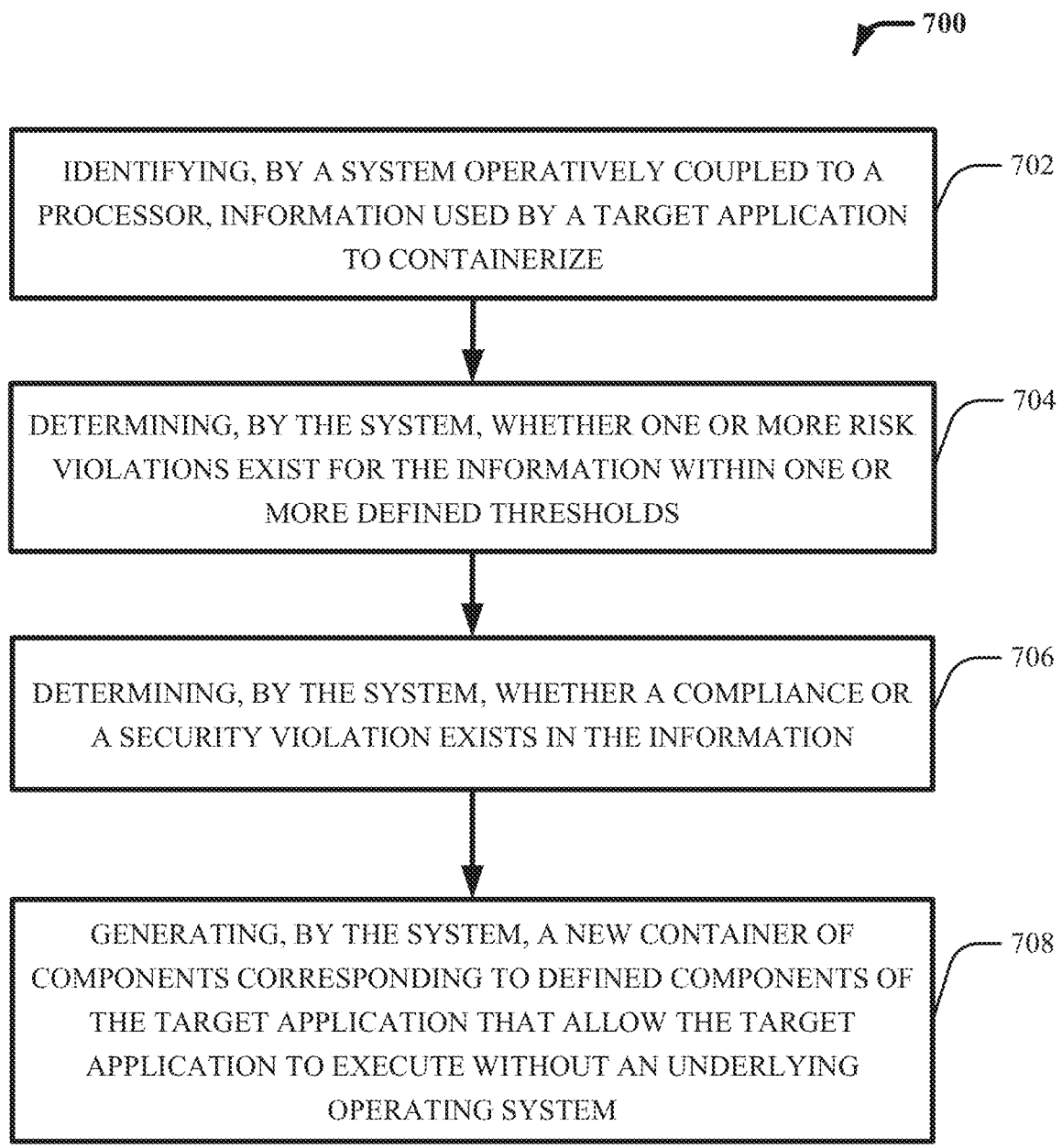
FIGS. 7, 8, 9 and 10 illustrate example, non-limiting computer-implemented methods facilitating compliance-aware runtime generation of containers in accordance with one or more embodiments described herein.

FIG. 7 illustrates an example, non-limiting computer-implemented method 700 in accordance with one or more embodiments described herein. Repetitive description of like elements employed in other embodiments described herein is omitted for sake of brevity. At 702, computer-implemented method 700 can comprise identifying, by a system operatively coupled to a processor, information used by a target application to containerize (e.g., via the collection component). The ldd command can be performed to determine immediate or initial dependencies. The chroot and strace commands can be performed in order to capture and analyze codes that are running to find errors. At 704, computer-implemented method 700 can comprise determining, by the system, whether one or more risk violations exist for the information within one or more defined thresholds (e.g., via the risk assessment component 108). The risk analysis can be performed by employing a risk or impact function. If the risk value is greater than the threshold, the service instance can be replaced. At 706, computer-implemented method 700 can comprise determining, by the system, whether a compliance or a security violation exists in the information, wherein the determining whether the compliance or security violation exists is performed based on a determination by the risk assessment component that one or more risk violations do not exist (e.g., via the compliance component 110). A multi-label SVM-based learning algorithm can be applied to capture compliance and security related issues. At 708, computer-implemented method 700 can comprise generating, by the system, a new container of components corresponding to defined components of the target application that allow the target application to execute without an underlying operating system, wherein the generating is based on a determination that no compliance or security violation exists in the information (e.g., via the construction component 112). The compliance-aware runtime generated container can allow the target application to be executed without an underlying operating system. In some embodiments, the container does not have a shell thereby making it an immutable container as well.

Figure 8:
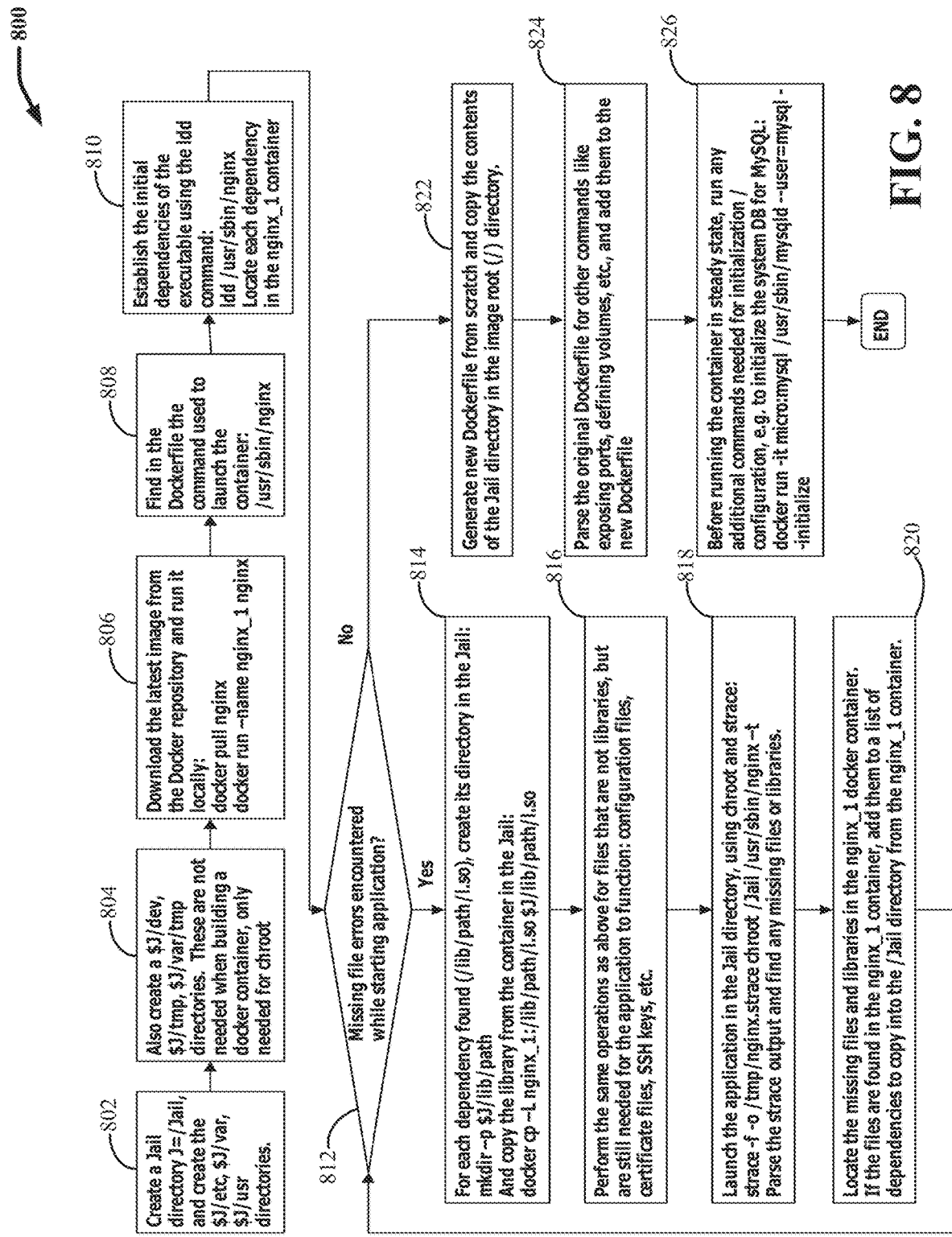

FIG. 8 illustrates an example, non-limiting computer-implemented method 800 in accordance with one or more embodiments described herein. Repetitive description of like elements employed in other embodiments described herein is omitted for sake of brevity. The computer-implemented method 800 is provided for an example application that is classified as an executable that can directly load a set of system libraries. The example, non-limiting example here utilizes nginx. At 802, computer-implemented method 800 can comprise creating a separate partition directory and other directories employed to run an application (e.g., via the collection component 106). At 804, computer-implemented method 800 can comprise creating directories needed to perform the chroot command (e.g., via the collection component 106). At 806, computer-implemented method 800 can comprise downloading the latest image from the docker repository and run it locally (e.g., via the collection component 106). At 808, computer-implemented method 800 can comprise finding in the dockerfile a command used to run a container (e.g., via the collection component 106). At 810, computer-implemented method 800 can comprise establishing initial dependencies of an executable using the ldd command (e.g., via the collection component 106). At 812, computer-implemented method 800 can comprise determining whether missing file errors encountered while starting application (e.g., via the collection component 106). If yes, then computer-implemented method 800 can comprise following steps 814, 816, 818 and 820 repeating step 812. If no, computer-implemented method 800 can comprise following steps 822, 824 and 826 to complete and end the process. If a missing file error is encountered, then at 814 for each dependency found (or, in some embodiments, for one or more dependencies found), computer-implemented method 800 can comprise creating its directory in the separate partition, and copying the library from the container in the separate partition (e.g., via the collection component 106). At 816, computer-implemented method 800 can comprise performing the same operations as above for files that are not libraries, but are still utilized for the application to function such as configuration files, certificate files, secure socket shell (SSH) keys, etc., (e.g., via the collection component 106). At 818, computer-implemented method 800 can comprise launching the application in the separate partition directory using the chroot and strace commands, and parse the strace output to find any missing files or libraries (e.g., via the collection component 106). At 820, computer-implemented method 800 can comprise locating the missing files and libraries in the docker container (e.g., via the collection component 106). If the files are found in the container, computer-implemented method 800 can comprise adding the files to a list of dependencies to copy into the separate partition directory. The computer-implemented method 800 can then comprise repeating steps 812, 814, 816, 818 and 820 until no missing file errors are encountered while starting an application. If no missing file errors are encountered while starting an application, then at 822, computer-implemented method 800 can comprise generating a new dockerfile from scratch and copy the contents of the separate partition directory in the image root directory (e.g., via the collection component 106). At 824, computer-implemented method 800 can comprise parsing the original dockerfile for other commands like exposing ports, defining volumes, etc., and add them to the new dockerfile (e.g., via the collection component 106). At 826, computer-implemented method 800 can comprise, before running the container in steady state, running any additional commands utilized for initialization or configuration (e.g., initializing, migrating and/or seeding a database of an application).

Figure 9:
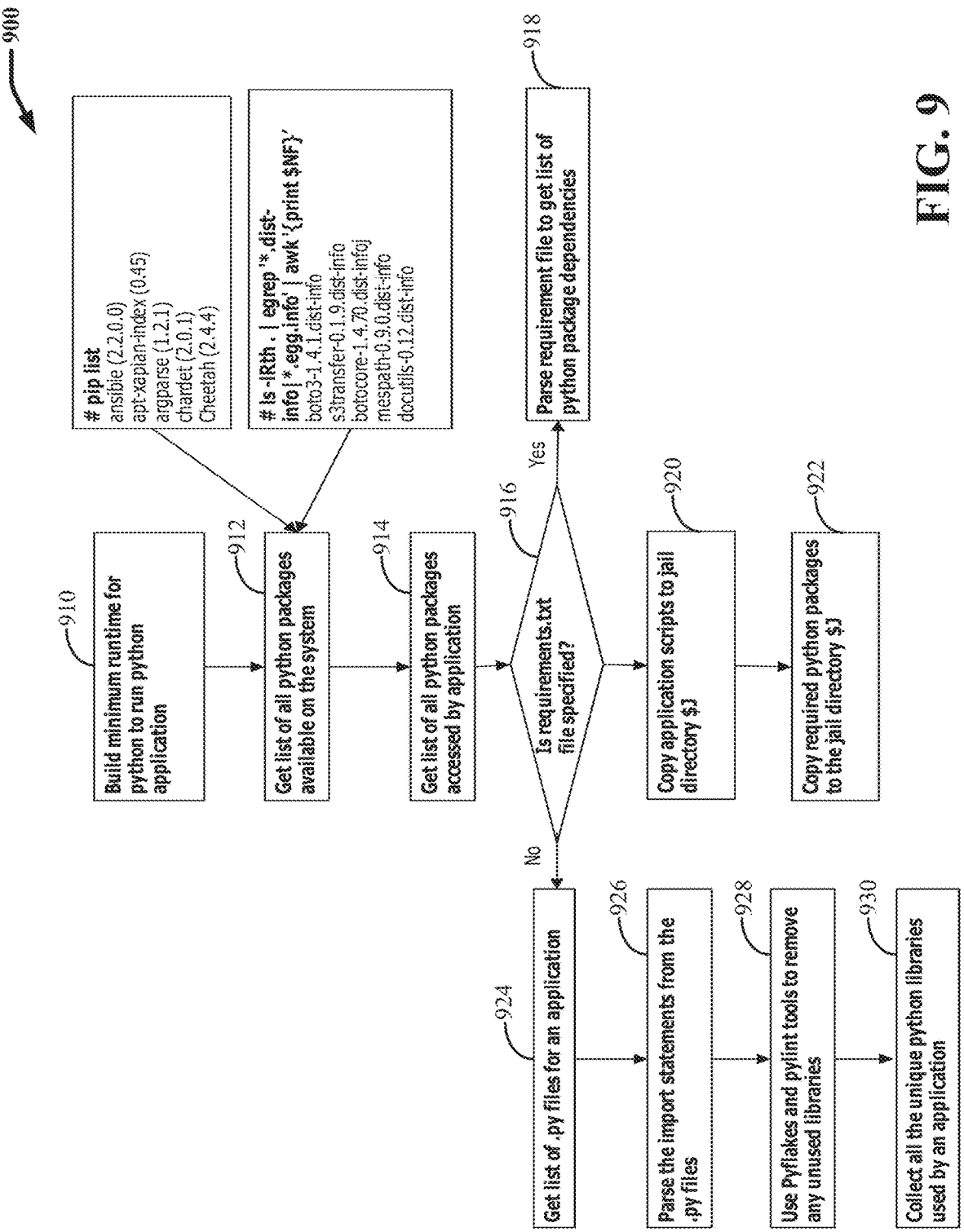
Figure 10:
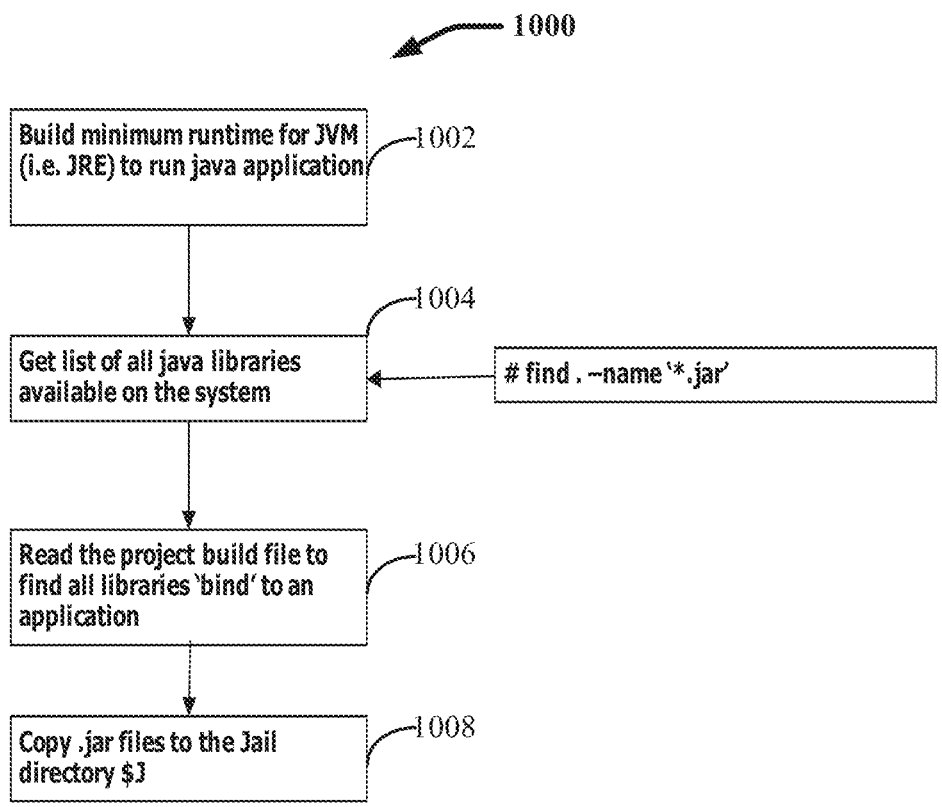

FIG. 9 and FIG. 10 also illustrate example, non-limiting methods 900 and 1000 in accordance with embodiments described herein. Methods 900 and 1000 include example applications that use a language runtime. For these types of applications, a slightly different process is employed to ensure or improve the likelihood that the interpreters can run within the container, and the applications have all (or, in some embodiments, one or more of) the files and/or libraries utilized to deploy. After the language runtime begins running, the application can be deployed. Python applications usually have a requirement file that have python wheels and packages that can be installed. Python usually has its own installer such as pip. These packages that are native to a specific application can be installed on a compliance-aware runtime container. Other applications that use a language runtime can also have similar processes. For Ruby, gems instead of packages can be employed, and Ruby can also employ building a Ruby runtime. A full collection of gems listed in a gem file used by an application can be obtained by running a gem list command in an application runtime environment. For Java, jars instead of gems or packages can be employed.

FIG. 9 illustrates an example, non-limiting method 900 in accordance with one or more embodiments described herein. Repetitive description of like elements employed in other embodiments described herein is omitted for sake of brevity. The computer-implemented method 900 illustrated is an example python runtime application. At 910, computer-implemented method 900 can comprise building a compliance-aware runtime for python to run a python application (e.g., via the collection component 106). At 912, computer-implemented method 900 can comprise determining a list of all (or, in some embodiments, one or more) python packages available on a system (e.g., via the collection component 106). At 914, computer-implemented method 900 can comprise determining a list of all (or, in some embodiments, one or more) python packages accessed by a target application (e.g., via the collection component 106). At 916, computer-implemented method 900 can comprise determining whether a requirements.txt file is specified (e.g., via the collection component 106). If yes (a requirements.txt file is specified), then at 918, computer-implemented method 900 can comprise parsing the requirement file to determine a list of python package dependencies (e.g., via the collection component 106). Then at 920, computer-implemented method 900 can comprise copying application scripts to separate partition directory (e.g., via the collection component 106). Further, at 922, computer-implemented method 900 can comprise copying defined (or, in some embodiments, employed or required) python packages to separate partition directory (e.g., via the collection component 106). If no requirements.txt file is specified, then at 924, computer-implemented method 900 can comprise getting a list of .py files for that application (e.g., via the collection component 106). Then at 926, computer-implemented method 900 can comprise parsing the import statements from the .py files (e.g., via the collection component 106). At 928, computer-implemented method 900 can comprise using pyflakes and pylint tools to remove any unused libraries (e.g., via the collection component 106). At 930, computer-implemented method 900 can comprise collecting all the unique python libraries used by an application (e.g., via the collection component 106). For example, a full collection of python packages used by an application can be obtained by running a pip freeze command in an application runtime environment.

FIG. 10 illustrates an example, non-limiting method 1000 in accordance with one or more embodiments described herein. Repetitive description of like elements employed in other embodiments described herein is omitted for sake of brevity. FIG. 10 illustrates an example process 1000 for a Java runtime application. At 1002, the computer-implemented method 1000 can comprise building a minimum runtime for a Java virtual machine (JVM) such as a Java Runtime Environment (JRE) to run java application (e.g., via the collection component 106). At 1004, the computer-implemented method 1000 can comprise determining a list of all java libraries available on a system (e.g., via the collection component 106). At 1006, the computer-implemented method 1000 can comprise reading the project build file to find all the libraries that bind to an application (e.g., via the collection component 106). At 1008, the computer-implemented method 1000 can comprise copying .jar files to a separate partition directory (e.g., via the collection component 106).

Figure 11:
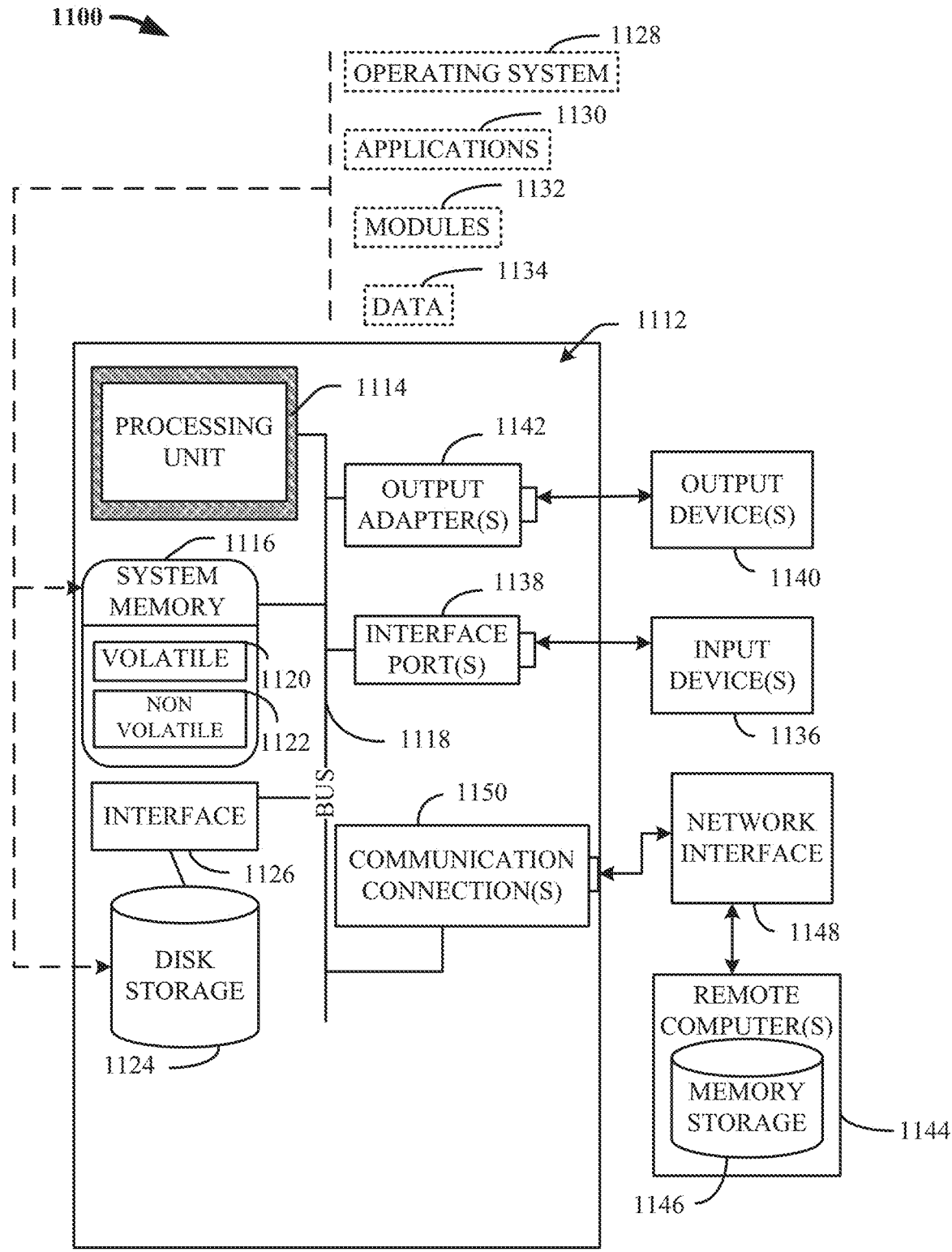
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
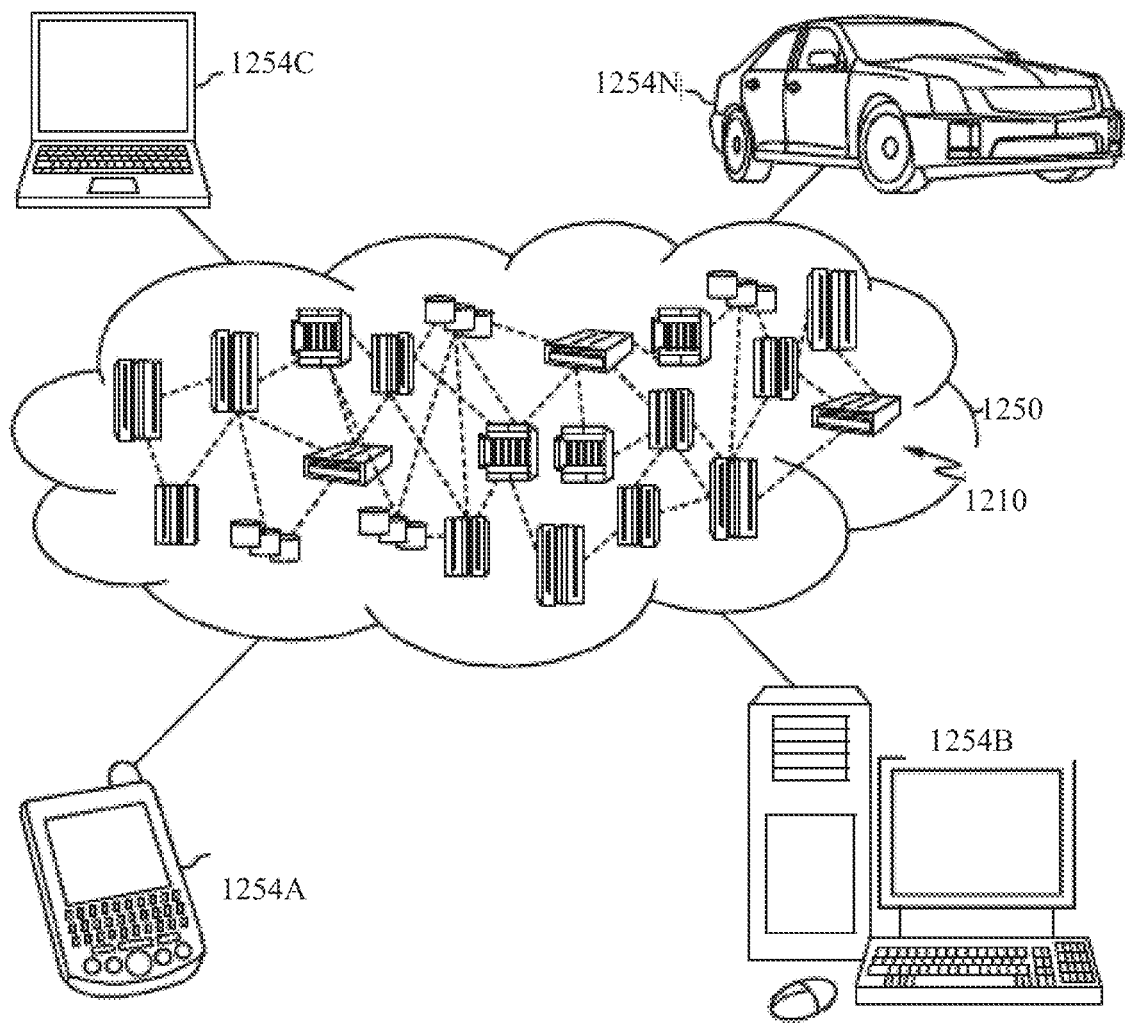
FIG. 12 depicts a cloud computing environment in which one or more embodiments described herein can be facilitated.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
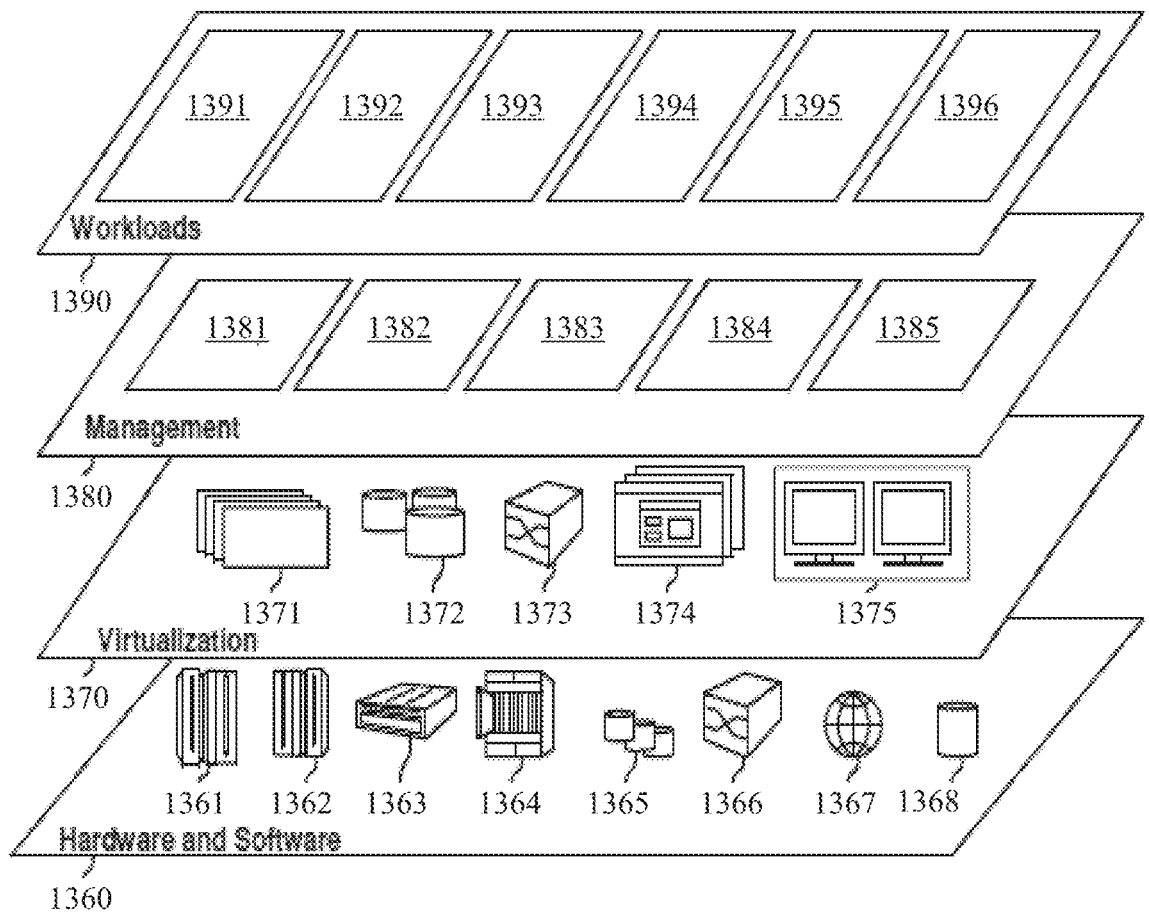
FIG. 13 depicts abstraction model layers in which one or more embodiments described herein can be facilitated.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and transaction model software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like.

The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components;
 a processor, operably coupled to the memory, and that executes computer executable components stored in the memory, wherein the computer executable components comprise:
  a collection component that identifies a set of components for generation of a container comprising a minimum set of components to allow a target application to execute without an operating system, wherein the set of components is initially empty, and the identification comprises iterative performance, until no errors occur, of:
   execute a set of commands on the target application in a partition environment comprising the set of components, and
   in response to an error during the execution indicating that a component is missing to allow the target application to execute without the operating system, add the component that is missing to the set of components in the partition environment;
  a risk assessment component that determines whether one or more risk violations exist for the set of components within one or more defined thresholds;
  a compliance component that determines whether a compliance or a security violation exists in the set of components, wherein the determination by the compliance component is performed based on a determination by the risk assessment component that one or more risk violations do not exist; and
  a construction component that, based on a determination that no compliance or security violation exists in the set of components, generates the container using the set of components.

2. The system of claim 1, further comprising a mapping component that automatically maps one or more features to one or more system operations or one or more libraries.

3. The system of claim 2, wherein a mapping of one or more features to one or more system operations or one or more libraries comprises a mapping of one or more compliance-related features.

4. The system of claim 2, wherein a mapping of one or more features to one or more system operations or one or more libraries comprises a mapping of one or more security-related features.

5. The system of claim 1, further comprising a pattern component that generates one or more patterns employed to automatically create one or more container images.

6. The system of claim 5, wherein the generation of the one or more patterns is performed based on a determination by the risk assessment component that one or more risk violations exist for the set of components or based on a determination by the compliance component that a compliance or a security violation exists in the set of components.

7. The system of claim 1, wherein the system provides for dynamic generation of one or more runtimes that contain a target code that facilitate execution of a service.

8. The system of claim 1, further comprising an operations component that halts a process of the operating system.

9. A computer program product for facilitating compliance-aware runtime generation of containers, the computer program product comprising a computer readable storage medium having program instructions embodied therewith, the program instructions executable by a processor to cause the processor to:

identify a set of components for generation of a container comprising a minimum set of components to allow a target application to execute without an operating system, wherein the set of components is initially empty, and the identification comprises iterative performance, until no errors occur, of:

execute a set of commands on the target application in a partition environment comprising the set of components, and in response to an error during the execution indicating that a component is missing to allow the target application to execute without the operating system, add the component that is missing to the set of components in the partition environment;

determine whether one or more risk violations exist for the set of components within one or more defined thresholds;

determine whether a compliance or a security violation exists in the set of components, wherein the determination regarding the compliance or security violation is based on a determination that one or more risk violations do not exist; and generate the container using the set of components.

10. The computer program product of claim 9, wherein the generation of the container is based on a determination that no compliance or security violation exists in the set of components.

11. The computer program product of claim 9, wherein the program instructions are further executable to cause the processor to:

automatically map one or more features to one or more system operations or one or more libraries.

12. The computer program product of claim 11, wherein the automatically mapping of one or more features to one or more system operations or one or more libraries comprises automatically mapping one or more compliance-related features.

13. The computer program product of claim 12, wherein the automatically mapping of one or more features to one or more system operations or one or more libraries comprises automatically mapping one or more security-related features.

14. The computer program product of claim 9, wherein the program instructions are further executable to cause the processor to:

generate one or more patterns employed to automatically create one or more container images.

15. The computer program product of claim 14, wherein the generation of the one or more patterns is performed based on a first determination that one or more risk violations exist for the set of components or based on a second determination that a compliance or a security violation exists in the set of components.

16. The computer program product of claim 9, wherein the target application is executing in the partition environment using a chroot command.

17. The computer program product of claim 9, wherein the target application is executing in the partition environment using a strace command.

18. The computer program product of claim 9, wherein a component of the set of components if a file.

19. The computer program product of claim 9, wherein a component of the set of components if a library.

20. The computer program product of claim 9, wherein the target application is a Java application.

* * * * *